Sept. 20, 1955 J. L. FERGUSON ET AL 2,718,105
BAG-LIKE CONTAINERS OF FLEXIBLE STRIP MATERIAL, PROCESS
OF MAKING SAME, PROCESS OF FILLING SAME, AND APPARATUS
FOR ACCOMPLISHING THESE PURPOSES
Filed Dec. 31, 1948 4 Sheets-Sheet 1
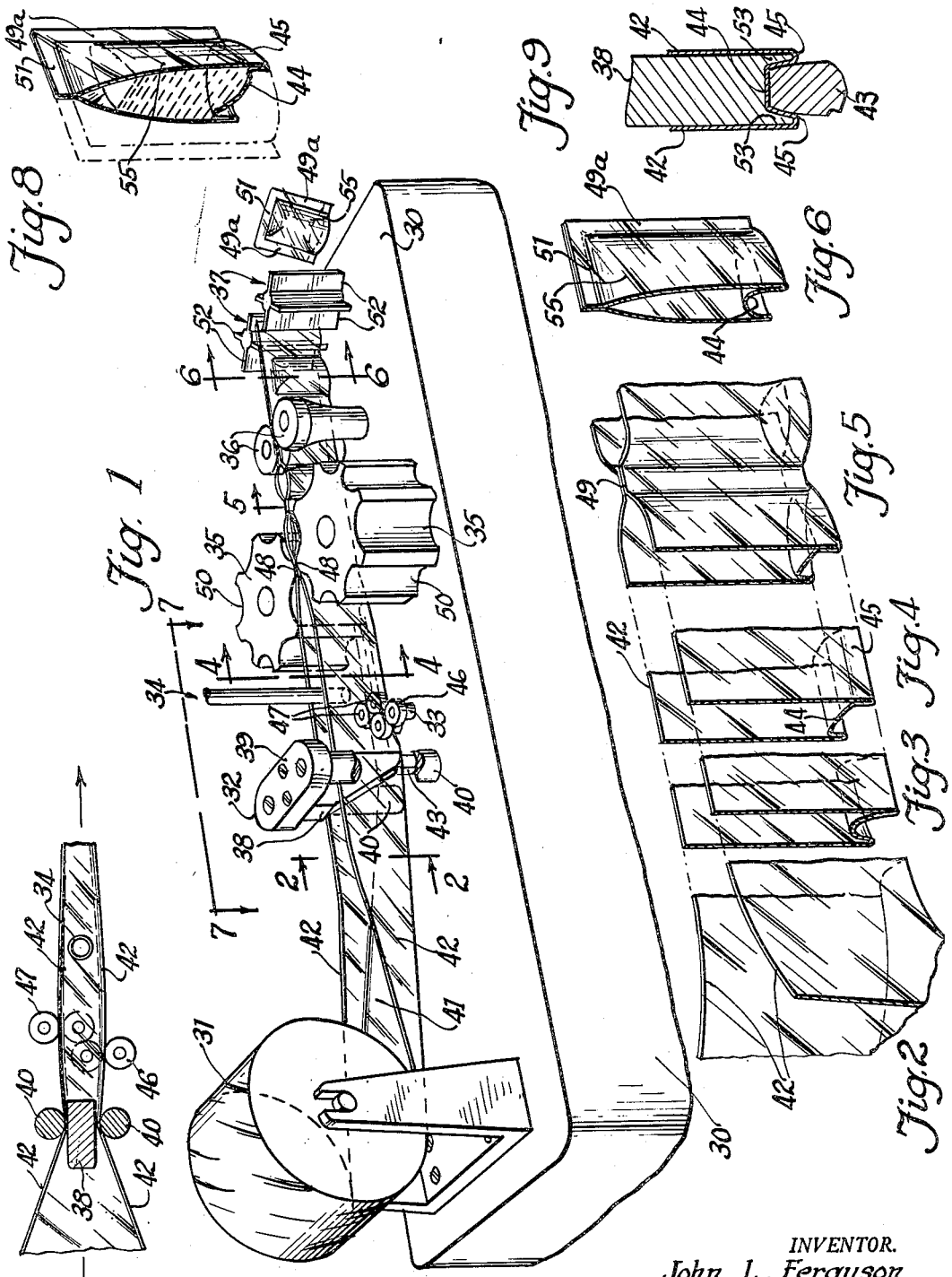
INVENTOR.
John L. Ferguson
Charles J. Rockcastle
By Thiess Olson & Mecklenburger
Attys Sept. 20, 1955    J. L. FERGUSON ET AL    2,718,105
BAG-LIKE CONTAINERS OF FLEXIBLE STRIP MATERIAL, PROCESS
OF MAKING SAME, PROCESS OF FILLING SAME, AND APPARATUS
FOR ACCOMPLISHING THESE PURPOSES
Filed Dec. 31, 1948    4 Sheets-Sheet 2
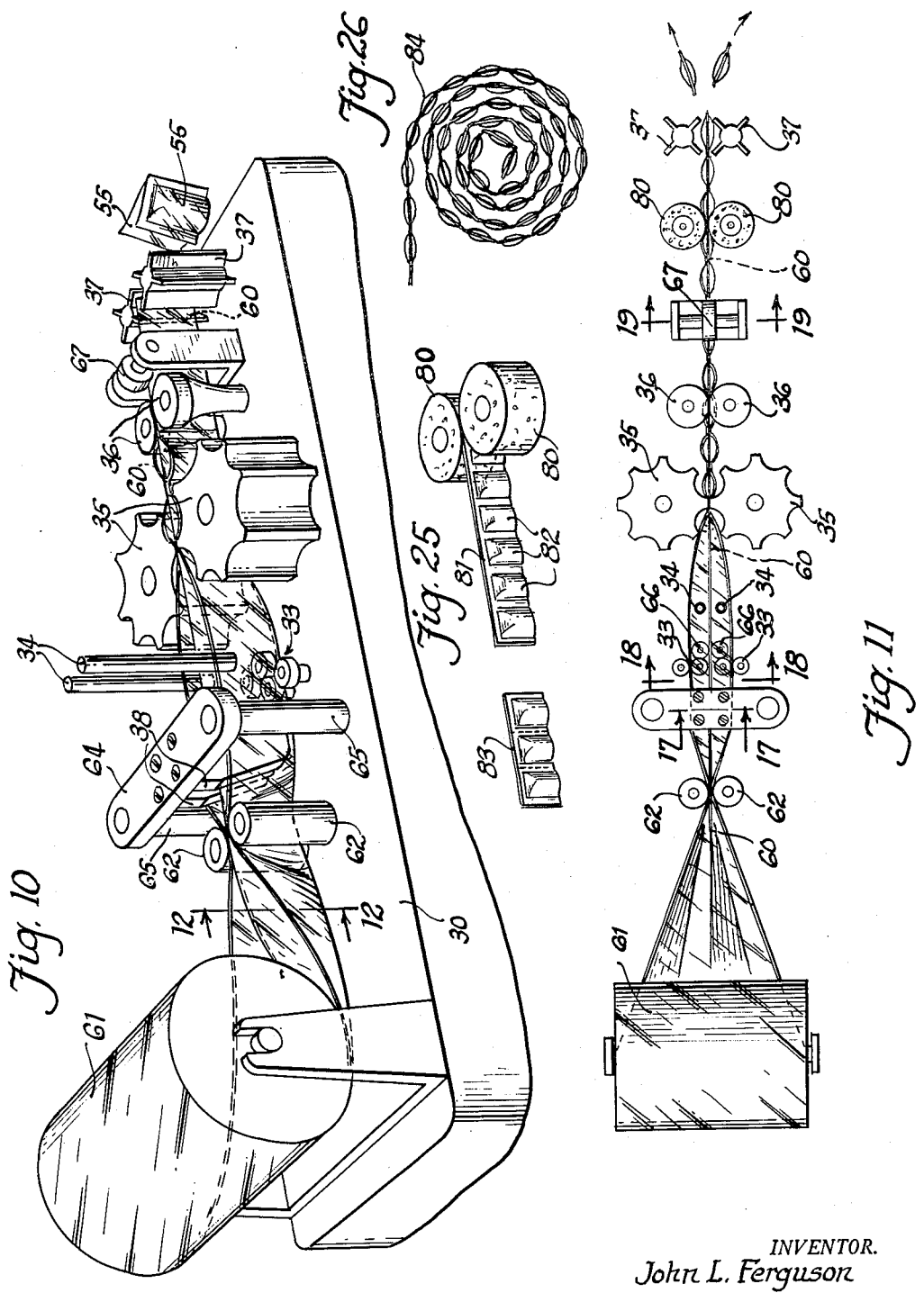
INVENTOR.
John L. Ferguson
Charles J. Rockcastle
By Thiess, Olson & Mecklenburger
Attys

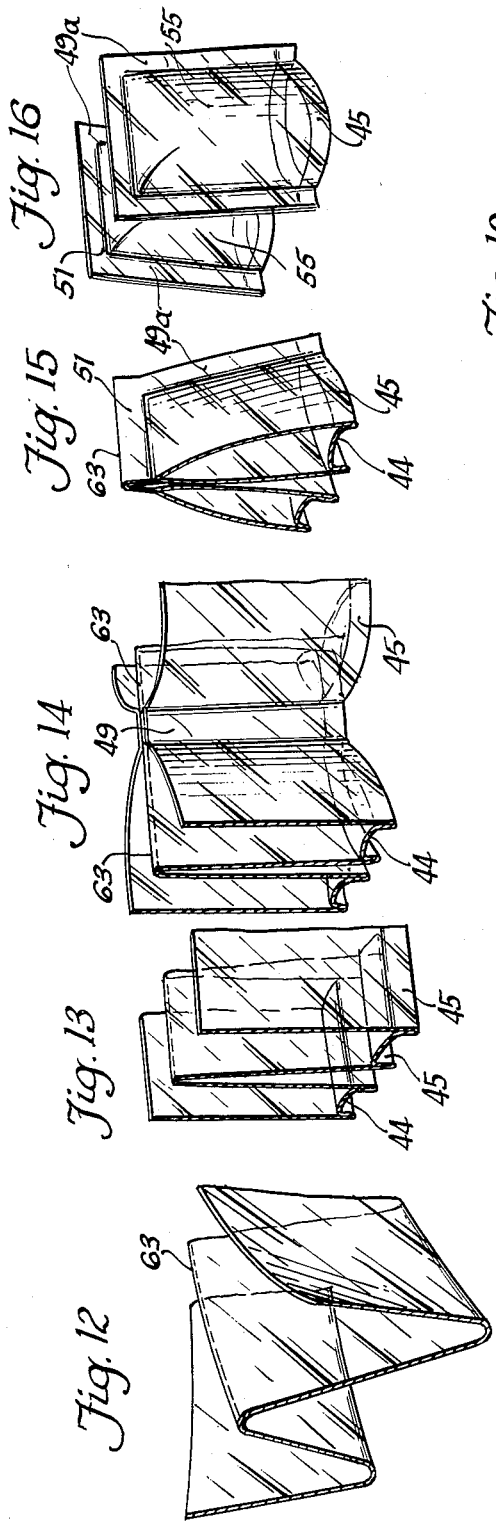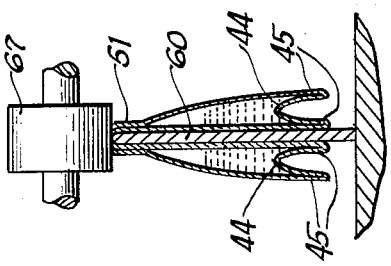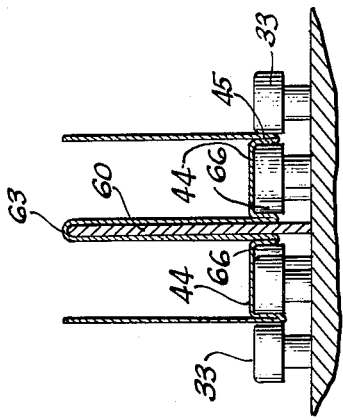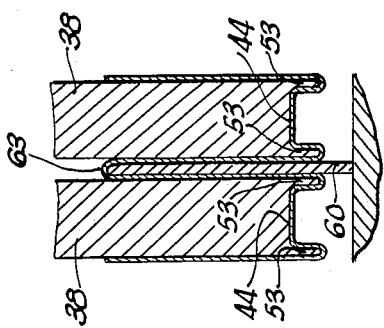

Sept. 20, 1955 J. L. FERGUSON ET AL 2,718,105
BAG-LIKE CONTAINERS OF FLEXIBLE STRIP MATERIAL, PROCESS
OF MAKING SAME, PROCESS OF FILLING SAME, AND APPARATUS
FOR ACCOMPLISHING THESE PURPOSES
Filed Dec. 31, 1948 4 Sheets-Sheet 4
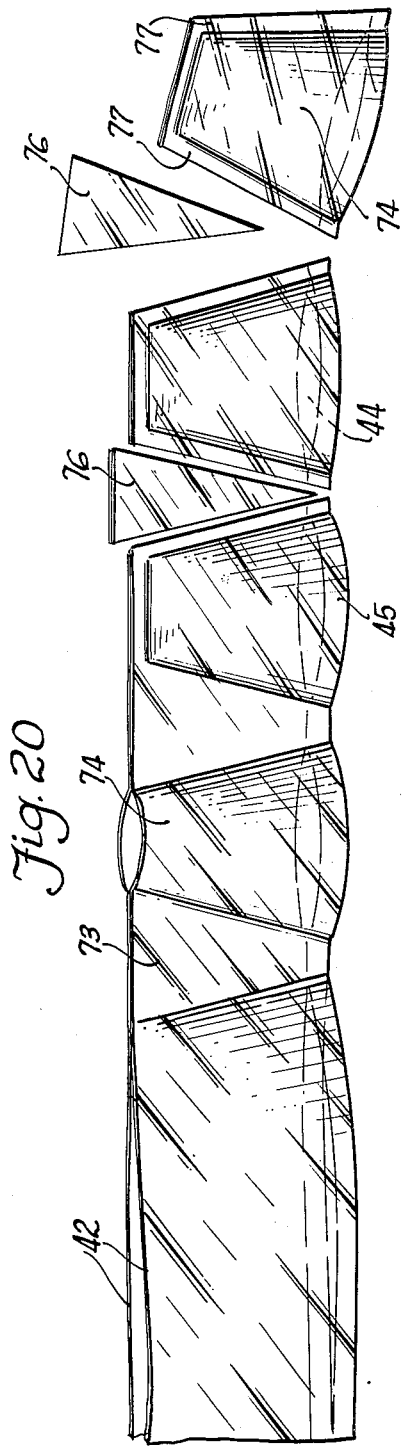
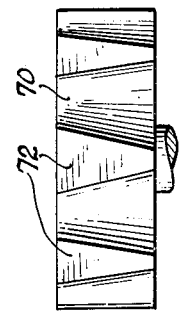
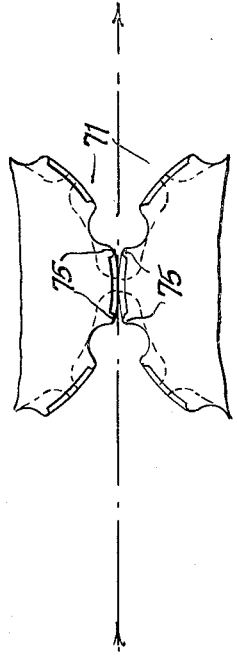
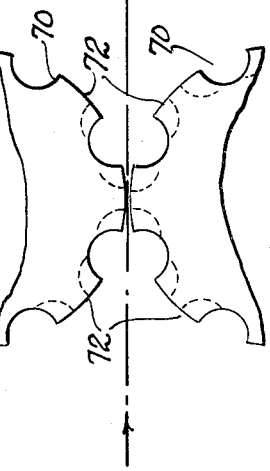
INVENTOR.
John L. Ferguson
Charles J. Rockcastle
By Thiess, Olson & Mecklenburger
att'ys United States Patent Office 2,718,105
Patented Sept. 20, 1955

2,718,105

BAG-LIKE CONTAINERS OF FLEXIBLE STRIP MATERIAL, PROCESS OF MAKING SAME, PROCESS OF FILLING SAME, AND APPARATUS FOR ACCOMPLISHING THESE PURPOSES

John L. Ferguson, Joliet, Ill., and Charles J. Rockcastle, Fort Wayne, Ind., assignors to J. L. Ferguson Company, Joliet, Ill., a corporation of Illinois Application December 31, 1948, Serial No. 68,522

11 Claims. (Cl. 53—5)

This invention relates to improvements in bag-like containers of flexible strip material, the continuous forming and/or filling of same, and apparatus therefor. The material may be any flexible medium, such for instance as a plastic, cloth, paper, metal or metal foil, transparent or otherwise, or in fact anything that will conform to the herein described requirements. Of course, if the selected material does not inherently lend itself to the described manipulation, it may be treated so to do.

An object of the invention is the provision of an improved container of envelope type which may be formed, filled, and sealed by a series of operations.

A further object of the invention is the provision of an improved container having a stiffened base of a type that it will remain upright when so set on a table or support, thereby eliminating the possibility of the contents draining therefrom after opening.

Further objects severally are, the method of making such containers from strips of the material by a series of steps performed thereon; the method of so making such containers and sealing the same; the method of filling containers during their course of manufacture; the method of making, filling and sealing containers, the filling being done in the course of manufacture of the container; and the method of making such flexible containers from strip material, filling the same during the course of forming the containers and before completion thereof, and sealing the same after so making and filling the same.

Still further objects are the provision of improved means and apparatus for the manufacture as a continuous process of such containers from continuous strip material, of filling containers with the desired quantity of product during the formation of the containers, of sealing the same and then severing the packages or preparing them for ready severance from continuous or multiple strips for individual use.

Further objects and advantages will appear from the detailed description and claims to follow, particularly in connection with the accompanying drawings, which illustrate more or less diagrammatically, and by way of example and not of limitation, both a single and double strip machine and apparatus for carrying out the new process and producing the novel container or package.

In these drawings, Fig. 1 is an isometric or top perspective view of a machine or apparatus for carrying out the process for making the containers and packages of this invention;

Figs. 2 to 6 are cross-sectional detail views of the container strip at different stages of formation;

Fig. 7 is a plan view of a portion of the apparatus indicated by the broken line 7—7 of Fig. 1;

Fig. 8 is a sectional perspective of an individual filled package as it is stood upon a table or other support;

Fig. 9 is a sectional detail of the container strip spreader and forming block or die at the bottom of the spreader;

Fig. 10 is a view similar to Fig. 1 but of a double container strip machine, that is, for forming two rows of containers from a single flexible strip of material;

Fig. 11 is a plan view of the machine of Fig. 10;

Figs. 12 to 16 are detail sectional views similar to those of Figs. 2 to 6 showing cross sections of the dual container strip at different stages of formation thereof;

Fig. 17 is a detail cross section of the machine on the line 17—17 of Fig. 11 at the spreaders;

Fig. 18 is a similar view on the line 18—18 of Fig. 11, in front of the lower sealing rolls;

Fig. 19 is a similar view on the line 19—19 of Fig. 11 showing the separating roll for the dual container strips;

Fig. 20 is a side view of the container strip when making packages of truncated cone outlines;

Fig. 21 is a side view of the transversal band sealing roll for making such container strip;

Fig. 22 is a similar view of one of the pair of severing rolls for such strips;

Fig. 23 is a fragmentary plan view of the pair of rolls of Fig. 21 in position to operate on the aforesaid container strip;

Fig. 24 is a similar view of the severing rolls of Fig. 22;

Fig. 25 is a top perspective view of seal or leakage testing rolls for liquid-filled packages and strips of such packages; and Fig. 26 is a view of a roll of the container strip.

Referring to Fig. 1, the numeral 30 indicates a suitable base or support upon which are located the devices for forming, filling and sealing the containers from a strip of material as it feeds through the machine, the mechanisms (not shown) for suitably operating the devices and which may be of any desired type to accomplish the purposes sought being within the said base or otherwise located.

In general, these devices on the base include a roll 31 of the strip of flexible material of which the packages are made, section forming and spreading devices 32 for imparting the proper narrow trough-like cross section to the strip at this point as it is drawn along, the side and bottom strips of which later form the two sides and bottoms of the individual packages when the latter are severed from the strip. The bottom rims are sealed at the rolls 33. The filling takes place at the spout or pipe 34; the strips are compressed and sealed together transversely by the rolls 35; the top edges of the strips may be sealed together at rolls 36, and the packages be severed or provided with a weakened line for severing at the rolls 37 to provide the individual filled and sealed packages 55.

The spreader and former device 32 includes a narrow female die or spreader 38 which may be of the roller type and provided with a depression or relieved surface and supported from above by the plate 39 which in turn is supported from the table 30 by the posts 40. The downward pressure of this spreader 38 on the web 41 causes the side portions 42 of the web to follow up and pass along the sides of the spreader and inside the posts 40 to form the two vertical sides of the container strip.

The lower end or engaging surface of this spreader or female die 38, as shown in Fig. 9, is grooved, depressed or hollowed out to form the side projections 53. These together with the forming block 43 or male die, which may also be in the form of a roller, beneath and mounted on the table 30 cause the bottom strip 44 as it passes therebetween to be upwardly bowed or folded, forming more or less of a W section, the sharp or folded edges 45 of which then pass on between the rolls of the respective pairs 46 and 47 of the group of rolls 33 before mentioned. These rolls 33 may be heated, electrically or in any other desired manner, to seal these portions of the strip together to form a strengthened or stiffened supporting rim for the base or bottoms of the packages when completed. The rolls 33 are preferably power-driven at the required peripheral speed suitably to conform to the travel of the container strip through the apparatus. The free portion 44 of the bottom strip should be wide enough to permit the rims 45 to bow outwardly centrally of the packages to form a widened bottom therefor to hold the package upright when placed upon a table or support, as will be more fully explained.

The container strip is next acted upon by the rolls 35 to compress and seal the side strips together transversely or vertically by a band wide enough when severed to leave the individual package on either side with a flat sealed edge. Thus, as seen in Fig. 1, with the rolls 35 on opposite sides of the container strip 42—42, the longitudinal peripheral ridges 48 are adapted simultaneously to engage the container strip and press and seal it. The width of this sealed band 49 (Fig. 5) transversely across the container strip is wide enough so that when later severed centrally the packages on either side will have a sufficiently wide sealed edge which may be designated 49a. These ridges 48 on the rolls 35 are far enough apart circumferentially to encompass the width of a container, and the grooves or depressed portions 50 in the rolls between the ridges 48 are deep enough to accommodate the container and its contents if filled, as will be explained. The rolls 35 are power-driven at the desired peripheral speed, may be heated, electrically or otherwise, if desired, are preferably the same size, and are timed so that the ridges 48 simultaneously and oppositely engage the container strip. The sealing ridges 48 on the rolls may be peripherally at any desired distance apart to give the desired width package. During this compression and sealing of the side strips together the free portion 44 of the bottom strip folds inwardly and upwardly like a plait at and near the sealed band but flattens out between to permit the sides 42 and stiffened bottom to bulge outwardly to provide a laterally widened base for the individual packages. Being power-driven, these rolls 35 assist in feeding the container strip along.

As before stated, the filling of the product to be dispensed in the containers, if they are to be filled in the machine, may take place through the pipe 34. The pipe enters the space between the side strips 42 following the spreader 38 and ahead of the vertical edge sealing rolls 35. The pipe 34 is connected with the source of supply (not shown) of the said product, and, of course, suitable controls (also not shown) are provided to adjust the quantity and rate of flow into the container strip as desired.

While various flowable materials, powdered or liquid, may be so handled in the apparatus, it is intended mainly for dispensing or handling of liquids, and particularly for serving individual portions of cream or the like in restaurants, etc., to take the place of messy, troublesome, unsanitary, expensive, individual cream pitchers. Assuming cream to be the product to be enclosed, the liquid may be allowed to flow continuously or otherwise through the pipe 34 into the trough-like container material and at such a depth and rate that the rolls 35 in rotating will pinch and seal off the desired quantity of product into cell-like increments as the latter are formed, the container strip with its filled cells being accommodated in the spaces 50 of the rolls 35 as they rotate.

As the container strip with its individual cells filled with the product travels along beyond the rolls 35, its upper side member edges are engaged by the top sealing rolls 36, which may be heated or otherwise and power-driven at the proper peripheral speed, to compress and seal a strip 51 therealong, which completes the sealing of the cell-like bag or container strip. These rolls 36 may be mounted on suitable shafts or supports extending up from the bed 30 of the machine.

If the container strip is not to be filled with a product in the machine but merely the empty containers to be formed, such use of the machine and operations being contemplated if desired, these sealing rolls for the upper edge of the strip and the tops of the containers would not be used.

When, however, the cell-like or container strip has been so sealed, it passes to the severing or weakening strip rolls 37. These rolls preferably, as shown, sever the individual packages from the continuous cell-like strip and kick them off at the end, where they are suitably received. These rolls may be edge cutting rolls but preferably are heated, electrically or otherwise, and sever the packages by burning or melting through the vertical bands 49. For this purpose, narrow ridges 52 are provided on the surface, which oppositely engage in their rotation the center of the vertical sealed band 49 and burn or sever it, and since there are only four ridges 52 on rolls 37, to eight ridges 48 on rolls 35, and the ridges on the two sets of rolls must be the same peripheral distance apart, the rolls 37 rotate at greater peripheral speed than the rolls 35, with the result that the severed package is given a thrust or kick and falls away from the end of the machine, as shown. As stated, however, instead of severing the band at this point, a weakened line by slots, perforations or the like may be made in the band 49, as indicated at 83 in Fig. 25, so that the individual package, while not actually severed from the strip, may be readily torn or pulled off. However, when not severing the packages at band 49, rolls 37 preferably shall have the same diameter and contour as rolls 35.

It will be noted that rolls 37 are so located along the container strip that their ridges 52 contact the said strip in their rotation at times when the ridges 48 of rolls 35 are out of sealing pressure contact with the strip, preferably about midway between such sealing contacts, whereby the rolls 37 may the better assist in moving the container strip along its path.

As indicated in Fig. 25, the container strip, whether the containers are filled and top sealed or unfilled and not sealed at the top, and with transverse weakened lines or not, may, if desired, be cut into multiple cell or contained strips 83 of any desired length and number of cells or containers each for ease of handling, shipping or other purposes; or such strip in any condition, filled or unfilled, with weakened lines or not, may be rolled up into continuous roll form, as indicated at 84, Fig. 26, and in any desired length or lengths of strip. Thus, the strip with cell-like containers therein, filled or unfilled and cross-weakened or not, and of any desired length, is an article of manufacture and claimable as such.

Fig. 8 indicates how the base of the bag spreads when a waiter, for instance, grasping the bag by the flat upper portion between fingers and thumb, more or less pushes or thrusts down on it when placing it on the table. The bag stands rigidly upright when released and does not tip over and, if opened, spill its contents on the table. Frequently a diner does not use or pour out all the cream. With this bag, in such case, it may be stood upright on the table, like an ordinary pitcher, and the remaining contents not spill out.

In the foregoing, a single container strip is passed through the machine and worked upon to produce and fill the individual packages. In Figs. 10 to 19 the same method and series of steps are shown applied to dual container strips, which, however, are made from a single strip of material, to make and fill a double row of the containers. In general, this is accomplished in the machine shown by providing a vertical center plate 60, seen more clearly in section in Figs. 17, 18, and 19, through the machine substantially from beginning to end, looping the strip of material centrally over the upper edge of this center plate at the start and performing the same operations as before on the depending container strip on each side of the center plate. Since many of the parts are the same as in the first form and operate in the same or substantially the same way, the same reference characters are used therefor in this double-row form.

The roll of material strip 61 of the same material as before may be wider to provide for the dual width required for the dual container strips. The flat web from the roll is gathered up into the double loop form shown in section in Fig. 12 by the pinch rollers 62 supported on the bed 30, the center fold looping over the upper edge of the center plate 60, as at the longitudinal bend 63, as indicated in Figs. 17 and 18, if the plate is carried that far forward, though it may be desired to start it at the forward edges of the spreaders 38, which in this instance are duplicated to depend on either side of the plate 60 and are supported from above by a cross bar 64 and posts 65, similar to the bar 39 and posts 40 in the first form.

The material strip in passing the spreaders 38, as indicated in Fig. 17, which tend to bear down upon it, is formed by the side portions 53 of the spreaders into the upwardly extending bottom strip or fold 44, as before described, a bottom roll 43 like that of the first form (Fig. 9) being employed, if desired, for each spreader 38.

As the material strip progresses, heated sealing rolls 33 compress and seal together the lower edges of the bottom folds of the material to form strengthened supporting bottom rims of the completed packages, as before and as shown in Fig. 13, except that in this instance there are three pairs of rolls, one pair each for the outside edges of the combined strip and an inner pair 66, Fig. 11, for the two inner edges, which are pressed by the rolls against the center plate 60 to accomplish the same result of sealing the inner rim edges of the container strips. Fig. 18 shows in section this bottom edge sealing step.

The filling pipes 34 for the product to be enclosed are in duplicate, one for each container strip on opposite sides of the central plate 60, and, though not shown, are supplied with a suitable supply source and controls.

The side seal rolls 35, like those in Fig. 1, compress and vertically seal the bands into cell-like portions, as before, except that in this instance they press the container strips against the center plate 60, but accomplish the same purpose of sealing a relatively broad band 49 across the container strips, which bands are later to be severed centrally to separate the packages from the cell-like strips and each package thereby having sealed side edges. The combined strip at this point is indicated in Fig. 14, the flattened sealed portion or band 49, however, in this instance extending to the top of the middle fold 63.

The next step is the compressing and sealing of the top edges, and this may be done by the heated rolls 36, like those of the former figure except that they press the edges 51 to be sealed against the center plate 60 on the inside. At this time the cell-like container strips are still connected through the edge 63 of the center fold of the complete strip, as shown in Fig. 15.

Since the cell-like containers in the combined strip are now filled and sealed, the next step may be the separation of the dual container strips. This may be done by a cutting roll or otherwise, but is conveniently and preferably accomplished by providing a hot roller 67, Figs. 10, 11 and 19, heated electrically or in any desired way, which engages the top of the connecting edge 63 of the dual-container strip, and as the strip contacts the roller it burns through said edge and entirely separates the dual-container strips.

The next operation is the severing of the packages 55 from their cell-like strips. This may be done by cutting rolls but is preferably done by the heated rolls or wheels 37, like those of the previously described form save for the fact that, as in the case of rolls 35 and 36, they press the sealed bands 49 against the center plate 60 and thereby separate the individual packages, each with a sealed vertical or side edge 49ª. As before, the rolls or wheels 37 operate at such a speed, preferably, as to kick the packages away when so severed, as indicated in Figs. 10 and 11. When so separated, as indicated in Fig. 16, and firmly set in an upright position, the base of the packages spreads centrally, thereby supporting the packages upright.

In the Fig. 10 form, the same as in the Fig. 1 form, the container strip is assisted in progression through the machine by contact with the power-driven rolls 35 and 37.

In the Fig. 10 form, as in the first form, the cut-off rolls, if desired, may merely weaken a line across the band strip by perforating holes or slots instead of a complete severance. However, when not severing the packages at band 49, the rolls 37 shall have the same diameter and contour as rolls 35.

In both cases, Figs. 1 and 10, while the continuous movement of the cell-like container strip is preferrred, its movement may be more or less intermittent and step by step, if desired.

In view of the foregoing, a further recital of the operation of the machine and method is believed unnecessary, since each step has been explained in detail.

The packages heretofore shown and explained have vertical separating bands 49. If desired to have packages with inclined side-sealed edges, similar to that shown at the right end of Fig. 20, the same can readily be made by providing side-sealing rolls 70, Figs. 21 and 23, in place of the rolls 35 in the other forms, and corresponding severing rolls 71, Figs. 22 and 24. Thus, as indicated in Fig. 23, the vertical compressing and sealing portions or ridges 72 on the peripheries of the rolls 70 are wider at the top than at the bottom, and as the trough-like container strip passes between them a separating band 73, Fig. 20, wider at the top than at the bottom is compressed and sealed together across the strip. This leaves cell-like portions of the form shown at 74 in the container strip between such sealed cross bands 73. When the container strip comes to the severing rolls 71, the latter may be provided with narrow severing bars 75 arranged in V-form across its peripheral face and dimensioned and timed to cut out a V-section 76 in the sealed portion 73, thereby leaving the packages 74 with inclined sealed edges 77 along each side and narrower at the top than at the base. This base, like that of the other packages, spreads centrally, thereby supporting the package upright when so placed on a table or the like.

Fig. 25 illustrates apparatus for testing bag-like packages of liquid product for leakage.

This comprises a pair of opposed driven pressure rolls 80 of foam rubber or suitable spring loaded or backed material to exert a limited pressure upon the sides of filled and sealed packages of flexible material as the same are passed between the rolls. The pressure so exerted upon the packages, which may be suitably adjusted thereto, will quickly expel the contained liquid from them through any defect in the material or the sealing thereof, or enough of it will be so expelled as to reveal any such defect, thereby eliminating the possibility of vending a defective package. At the same time the pressure should be properly limited by the character of the pressure surfaces of the rolls or the spring backing or otherwise to avoid injury to packages of suitable material and sealings.

While the operation of so testing the packages may be carried out on separate packages suitably fed between the rolls or on separate multiple package strips, whether the bands between packages are weakened or not, it is preferably performed while the packages are in strip form, as indicated by the numeral 81 in Fig. 25 and in which 82 designates the bulging filled packages of the strip. This strip 81 is illustrated as the same as that produced by the machines of Figs. 1 and 10 before final severance of the packages from the strip, though the strip with merely weakened lines between the packages, as shown at the left in Fig. 25 and numbered 83, instead of completely severed packages, as above described, may be passed similarly through the rolls for testing. In the latter case, the testing rolls 80 may follow the weakening rolls instead of preceding them in the line of operations.

While this testing device may be a separate unit, it may be included as a component part of the container making, filling and sealing machines of Figs. 1 and 10, and is so shown in Fig. 11, where it is included in the production line thereof in advance of the severing rolls 37. Although this Figure 10 shows the dual-container strip machine, the testing rolls may be included in the same relative position in the single-strip machine of Fig. 1. This Figure 10, therefore, in that respect, is intended as illustrative of both forms.

It will be apparent that the invention may be varied in its physical embodiment without departing from the spirit of the invention, and it is desired, therefore, that the invention be limited only by the prior art and the scope of the appended claims.

What is claimed is:

1. A machine for making containers of flexible continuous strip material as it is advanced through the machine, comprising a mounting structure, a bracket thereon to support a roll of said strip material, forming apparatus mounted on said structure in the line of advancement of said strip material and having means to engage and form said strip material into a trough-like section with a re-entrant upward longitudinal fold in the bottom of the trough as the strip is advanced from the roll, sealing means carried by said structure following said forming apparatus and in the path of each of the lower edges of said bottom fold to grip and seal the sides of the same together into a relatively narrow continuous stiffened edge band as said strip material progresses through the machine, and cross compressing and sealing means on the said structure beyond the said edge sealing means and in the strip path arranged to engage and seal bands transversely across said strip at spaced intervals to form individual containers in said strip.

2. A machine for forming and filling a double or dual row of containers from a single strip of flexible material, comprising a mounting structure, a center plate mounted edgewise thereon and extending longitudinally of the machine, a spreader and former mounted on said structure on each side of the center plate to engage a strip of said flexible material as it is fed thereto while suspended centrally from the upper edge of the center plate, said spreaders and formers having means to form the said single material strip into dual trough-like formed container strips suspended on each side of the center plate and with inwardly and upwardly extending bottom folds for each container strip, a group of bottom rim sealing rolls mounted on said structure to press and seal together the lower edges of the bottom folds of the side members to provide stiffened supporting rims for the bottoms of the containers, means in connection with the machine for filling a quantity of product respectively into the dual trough-like container strips, a pair of sealing rolls on the structure one on each side of the center plate, each having sealing ribs and depressed spaces between the ribs spaced to correspond to the width of containers to be formed and arranged to press the dual container strips against the center plate and seal transverse bands across the dual container strips to form side edge seals for the individual containers when separated from the container strip, top edge pressing and sealing rolls to press the dual container strips against the center plate and seal the top edges of the said container strips, a separating cutoff above the combined dual container strips and pressing against the upper edge of the center plate to separate the dual container strip longitudinally into two individual container strips one on each side of said center plate, and severing or cutoff rolls to press the container strips at such said transverse bands and midway thereof against the respective sides of the center plate to sever individual containers from said container strips, each container being filled, and having sealed edges and a supporting rim base, the latter adapted to spread laterally and form a stable support for the container when stood upright upon a support.

3. A container having folds extending generally in one direction only whereby said container may readily be formed in a continuous process from a single strip of flexible material, said container having a bottom wall, the material of said bottom wall being turned down only at two opposed sides thereof to form one thickness of a downwardly extending flange at each of said sides and being turned up from the bottom of said flanges to form second thickness of flange and opposed container walls, said first and second thicknesses of said flanges being bonded together to form stiffened flanges, said opposed walls extending toward and to each other at opposite ends of said container and being bonded to each other, and said bottom wall being collapsed adjacent said ends.

4. A plastic container having folds extending generally in one direction only whereby said container may readily be formed in a continuous process from a single strip of flexible plastic, said container having a bottom wall, the material of said bottom wall being turned down only at two opposed sides thereof to form one thickness of a downwardly extending flange at each of said sides and being turned up from the bottom of said flanges to form second thicknesses of flange and opposed container walls, said first and second thicknesses of said flanges being heat sealed together to form stiffened flanges, said opposed walls extending toward and to each other at opposite ends of said container and being heat sealed to each other, and said bottom wall being collapsed adjacent said ends.

5. A connected strip of individual containers having folds extended generally in one direction only whereby said strip of containers may readily be formed in a continuous process from a single strip of flexible material, said containers having bottom walls, the material of said bottom walls being turned down only at two opposed sides thereof to form one thickness of a downwardly extending flange at each of said sides and being turned up from the bottom of said flanges to form second thicknesses of flange and opposed container walls, said first and second thicknesses of said flanges being bonded together to form stiffened flanges, said opposed walls of said containers extending toward and to each other at opposite ends of each of said containers and being bonded to each other over appreciable areas whereby said individual containers may be severed from each other along lines falling within said appreciable areas, said bottom walls of said containers being collapsed adjacent said opposite ends of said containers.

6. The method of continuously forming containers from an elongated strip of flexible material as said strip continuously advances; which comprises guiding said continuously advancing strip into a trough-like configuration having a bottom and two opposed walls extending longitudinally of said strip, guiding the bottom of such trough-like configuration upwardly between said walls to form a false bottom and two, downwardly extending, double thickness flanges, bonding the two thicknesses of each of said flanges together, and subsequently pressing said two opposed walls together at spaced areas along the length thereof, said bottom being permitted to collapse at and adjacent said spaced areas, and bonding said opposed walls to each other at said spaced areas.

7. The method of continuously forming containers from an elongated strip of flexible plastic as said strip continuously advances; which comprises guiding said continuously advancing strip into a trough-like configuration having a bottom and two opposed walls extending longitudinally of said strip, guiding the bottom of such trough-like configuration upwardly between said walls to form a false bottom and two, downwardly extending, double thickness flanges, heat sealing the two thicknesses of each of said flanges together, and subsequently pressing said two opposed walls together at spaced areas along the length thereof, said bottom being permitted to collapse at and adjacent said spaced areas, and heat sealing said opposed walls to each other at said spaced areas.

8. The method of continuously forming containers from an elongated strip of flexible material as said strip continuously advances, which comprises guiding said continuously advancing strip into a trough-like configuration having a bottom and two opposed walls extending longitudinally of said strip, guiding the bottom of such trough-like configuration upwardly between said walls to form a false bottom and two, downwardly extending, double thickness flanges, bonding the two thicknesses of each of said flanges together, and subsequently pressing said two opposed walls together at spaced areas along the length thereof, said bottom being permitted to collapse at and adjacent said spaced areas, and bonding said opposed walls to each other at said spaced areas, and severing the adjacent containers thus formed from each other along lines falling within said spaced areas.

9. A machine for making containers of flexible strip material as it is continuously advanced through the machine, comprising apparatus for guiding said continuously advancing strip into a trough-like configuration having a bottom and two opposed walls extending longitudinally of said strip, apparatus for guiding the bottom of such trough-like configuration upwardly between said walls to form a false bottom and two, downwardly extending, double thickness flanges, sealing means lying adjacent the path of said double thickness flanges and engageable thereby for sealing the two thicknesses of said flanges together, and rotatable sealing means lying adjacent the path of said strip for pressing said two opposed walls together at spaced areas along the length thereof and for sealing said opposed walls to each other over said spaced areas.

10. A machine for making containers of flexible strip material as it is continuously advanced through the machine, comprising apparatus for guiding said continuously advancing strip into a trough-like configuration having a bottom and two opposed walls extending longitudinally of said strip, apparatus for guiding the bottom of such trough-like configuration upwardly between said walls to form a false bottom and two, downwardly extending, double thickness flanges, sealing means lying adjacent the path of said double thickness flanges and engageable thereby for sealing the two thicknesses of said flanges together, rotatable sealing means lying adjacent the path of said strip for pressing said two opposed walls together at spaced areas along the length thereof and for sealing said opposed walls to each other over said spaced areas, and means for severing the adjacent containers thus formed from each other along lines falling within said spaced areas.

11. A machine for forming and filling a double or dual row of containers from a single strip of flexible material, comprising a mounting structure, a center plate mounted edgewise thereon and extending longitudinally of the machine, a spreader and former mounted on said structure on each side of the center plate to engage a strip of said flexible material as it is fed thereto while suspended centrally from the upper edge of the center plate, said spreaders and formers having means to form the said single material strip into dual trough-like formed container strips suspended on each side of the center plate and with inwardly and upwardly extending bottom folds for each container strip, a group of bottom rim sealing rolls mounted on said structure to press and seal together the lower edges of the bottom folds of the side members to provide stiffened supporting rims for the bottoms of the containers, a pair of sealing rolls on the structure one on each side of the center plate, each having sealing ribs and depressed spaces between the ribs spaced to correspond to the width of containers to be formed and arranged to press the dual container strips against the center plate and seal transverse bands across the dual container strips to form side edge seals for the individual containers when separated from the container strip, a separating cutoff above the combined dual container strips and pressing against the upper edge of the center plate to separate the dual container strip longitudinally into two individual container strips one on each side of said center plate, and severing or cutoff rolls to press the container strips at such said transverse bands and midway thereof against the respective sides of the center plate to sever individual containers from said container strips.

References Cited in the file of this patent

UNITED STATES PATENTS

| | | |
|---|---|---|
| 1,443,280 | Schmackenberg | Jan. 23, 1923 |
| 1,683,584 | Hogan | Sept. 4, 1928 |
| 2,015,972 | Sodergren | Oct. 1, 1935 |
| 2,125,758 | Waters | Aug. 2, 1938 |
| 2,139,039 | Salfisberg | Dec. 6, 1938 |
| 2,146,308 | Maxfield | Feb. 7, 1939 |
| 2,154,521 | Maxfield | Apr. 18, 1939 |
| 2,166,643 | Salfisberg | July 18, 1939 |
| 2,194,451 | Soubier | Mar. 19, 1940 |
| 2,213,602 | Yates | Sept. 3, 1940 |
| 2,265,075 | Knuetter | Dec. 2, 1941 |
| 2,272,530 | Patterson | Feb. 10, 1942 |
| 2,283,059 | Knuetter | May 12, 1942 |
| 2,290,564 | Krueger | July 21, 1942 |
| 2,301,771 | Billeb | Nov. 10, 1942 |
| 2,325,673 | Gurwick | Aug. 3, 1943 |
| 2,330,361 | Howard | Sept. 28, 1943 |
| 2,340,260 | Cluman | Jan. 25, 1944 |
| 2,344,369 | Salfisberg | Mar. 14, 1944 |
| 2,374,793 | Waters | May 1, 1945 |
| 2,390,071 | Barnett | Dec. 4, 1945 |
| 2,391,351 | Schmidt | Dec. 18, 1945 |
| 2,467,767 | Mertler | Apr. 19, 1949 |
| 2,475,617 | Irmscher | July 12, 1949 |

FOREIGN PATENTS

| | | |
|---|---|---|
| 330,020 | Italy | Oct. 1, 1935 |
| 472,874 | Great Britain | Oct. 1, 1937 |